United States Patent [19]

Nakajima

[11] Patent Number: 5,125,683
[45] Date of Patent: Jun. 30, 1992

[54] COVER FOR AIR BAG SYSTEM
[75] Inventor: Hideo Nakajima, Hikone, Japan
[73] Assignee: Takata Corporation, Tokyo, Japan
[21] Appl. No.: 617,603
[22] Filed: Nov. 26, 1990
[30] Foreign Application Priority Data Dec. 14, 1989 [JP] Japan .................. 1-324416

[51] Int. Cl.⁵ .............................. B60R 21/16
[52] U.S. Cl. .................. 280/731; 280/732; 280/743
[58] Field of Search .......... 280/731, 732, 743
[56] References Cited

U.S. PATENT DOCUMENTS

| 4,327,937 | 5/1982 | Scholz et al. | 280/732 |
| 4,810,005 | 3/1989 | Föhl | 280/732 |
| 4,836,576 | 6/1984 | Werner et al. | 280/731 |
| 4,852,907 | 8/1989 | Shiraki et al. | 280/731 |
| 4,878,689 | 11/1989 | Mitzkus et al. | 280/731 |

FOREIGN PATENT DOCUMENTS

| 284123 | 2/1988 | European Pat. Off. |
| 2848547 | 5/1980 | Fed. Rep. of Germany |
| 8713154 | 12/1987 | Fed. Rep. of Germany |
| 2449004 | 9/1980 | France |
| 2210338 | 6/1989 | United Kingdom |

Primary Examiner—Kenneth R. Rice
Attorney, Agent, or Firm—Kanesaka and Takeuchi

[57] ABSTRACT

A cover for air bag system in which a plastic deformation member is buried or added in order to hold a deformation state when the cover cleaves and deforms by opening the air bag.

7 Claims, 2 Drawing Sheets

COVER FOR AIR BAG SYSTEM

FIELD OF THE INVENTION AND RELATED ART STATEMENT

The present invention relates to a cover (module cover) for an air bag system for protecting occupant by opening at the time of a collision or so of a car.

In the air bag system, the folded air bag is attached to a mounting plate called as a retainer, and the air bag is covered by the cover. The cover is also attached to the retainer similarly.

Further, an inflator is attached to the retainer directly or through an appropriate mounting member, and the inflator discharges a gas when collision of a car occurs to open the air bag immediately.

The cover the air bag system which is attached to steering wheel of the car is a box type having a side wall and canopy. Further, as the side wall and canopy, a reinforced material by burying or adding a reinforcement such like a network member of synthetic fiber, a thin metal plate, and a synthetic resin plate, can be used.

A starting line (tear line) for a cleavage of the cover when the air bag opens, is provided on the cover. In the tear line portion, the strength is lower than that of the surrounding portion, and the tear line is formed in the state of fixed linear shape. The cover cleaves along the tear line when the air bag opens.

One example of the conventional air bag system is explained based on FIGS. 4 and 5.

In FIG. 4, a retainer 10 has a cover mounting member comprising a plate member 14 to which an air bag 12 is attached and a standing piece 16 for standing to the opposite direction of the occupant from the edge of the plate member 14. The air bag 12 is covered by a module cover 10 in the state of folding, and a base side of the cover 18 is fixed by means of a rivet 20 relative to the standing piece 16. A reinforcement (not shown) is buried in the cover by an insert molding method. 22 is an inflator and is fixed on the retainer 10 so that the top side of the inflator projects into the air bag 12 through an opening 24 formed in the plate member 14. 26 is a ring and an edge portion of the opening of the air bag 12 is sandwiched between the ring 26 and the edge portion of the opening 24 of the plate member 14. Whereby, the air bag 12 is fixed on the retainer 10. 28 is a tear line provided on the cover 18.

According to the air bag system as mentioned above, if the inflator 22 actuates in response to the collision of the car, a large amount of gas is discharged from the inflator 22 immediately to open the air bag 12. In accordance with the opening of the air bag 12, as shown in FIG. 5, the cover 18 cleaves along the tear line 28, and the air bag 12 opens within the car immediately to achieve the protection of the occupant.

Since the cover is essentially composed of a synthetic resin, it has a flexibility. further, the conventional reinforcement buried or added to the cover is also a network member of synthetic fiber, thin metal plate, and synthetic resin plate, it has a flexibility. Therefore, as shown in FIG. 5, although a cleavage piece 18a reaches at the state as shown in a just after the air bag 12 opens, the cleavage piece 18a is going to return to the position as shown in a' by an elasticity of itself soon. Accordingly, the air bag 12 is lifted to the direction of the occupant by the force of the cleavage piece 18a which is going to return to the original position (A and B in the drawings) when the air bag 12 opens.

OBJECT AND SUMMARY OF THE INVENTION

The object of the present invention is to provide an improved cover an air bag system, in which the air bag opens to all directions immediately and largely since the cleavage piece of the cover can hold the deformation at the time of when the air bag opens.

The feature of the present invention is to bury or add a plastic deformation member.

In the cover for air bag system of the present invention, if the cover cleaves and deforms at the time of when the air bag opens, the cleavage piece formed becomes easy to hold the shape after the deformation by the plastic deformation member. Therefore, the module cover remains in the state in which the module cover cleaves largely, and the air bag can open to all directions immediately and widely.

In the present invention, the plastic deformation member is preferably to have a plate shape. However, a wire type and tape type can be used. Further, in all of the plastic deformation member of the plate type, the member may have a large number of holes such like a punching metal, and a smaller hole. What is preferable is that a through hole of a rivet for fixing the cover on the retainer is provided on the plate type plastic deformation member.

As the plastic deformation member of the present invention, a metal, a synthetic resin, and metal ceramic composites (cermet) are most suitable. In view of a corrosion-resistant, although aluminum, copper, nickel, and an alloy thereof are cited as the desirable material, a stainless can be also used. Furthermore, iron with anticorrosive material is also suitable for use.

DESCRIPTION OF THE PREFERRED EMBODIMENTS

Hereinafter, the embodiments of the present invention are explained.

Figure 1:
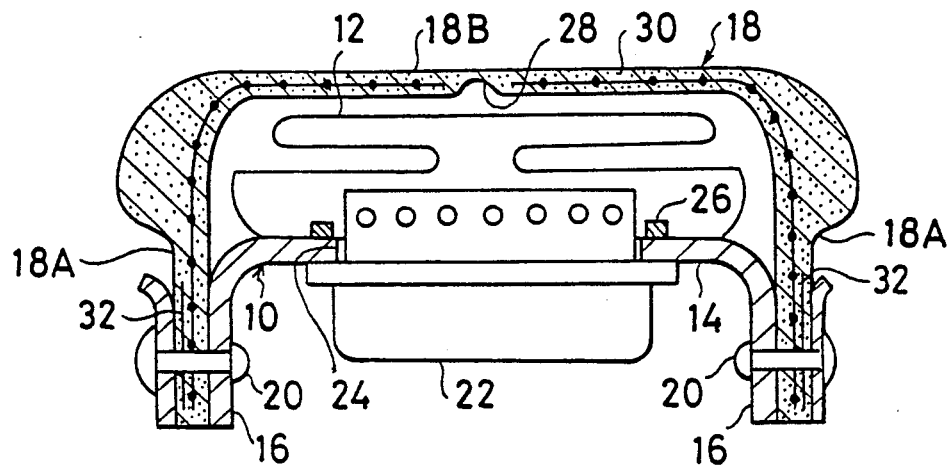
FIG. 1 is a sectional view of the air bag system using the cover of one embodiment of the present invention.
Figure 2:
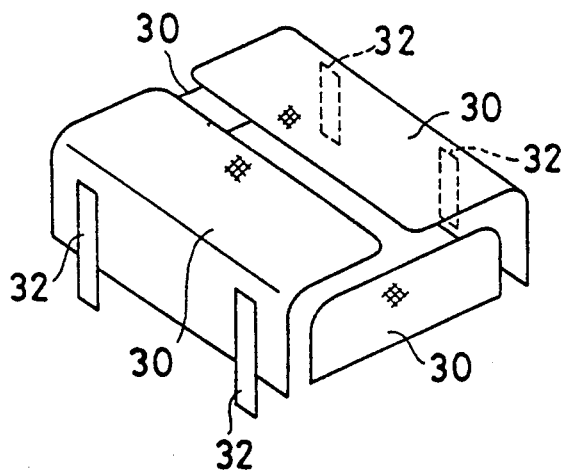
FIG. 2 is a perspetive view for showing an arrangement of the reinforcement on the cover of the present invention.
Figure 3:
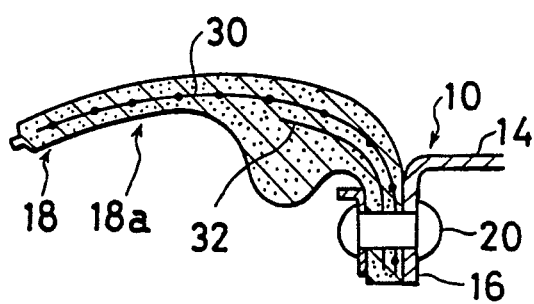
FIG. 3 is an illustration for showing operation of the air bag system of the present invention.
Figure 4:
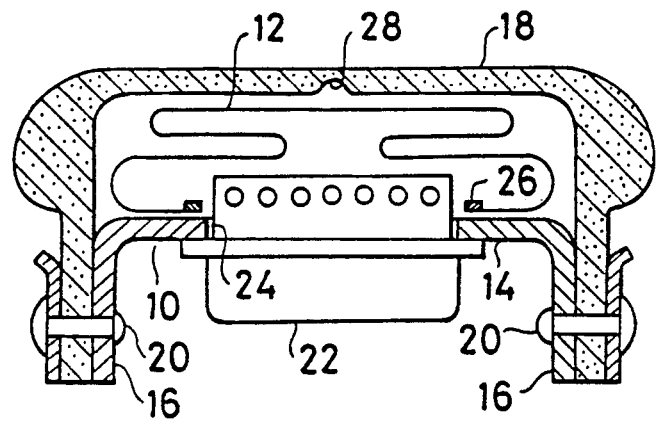
FIG. 4 is a vertical sectional view of the conventional air bag system.
Figure 5:
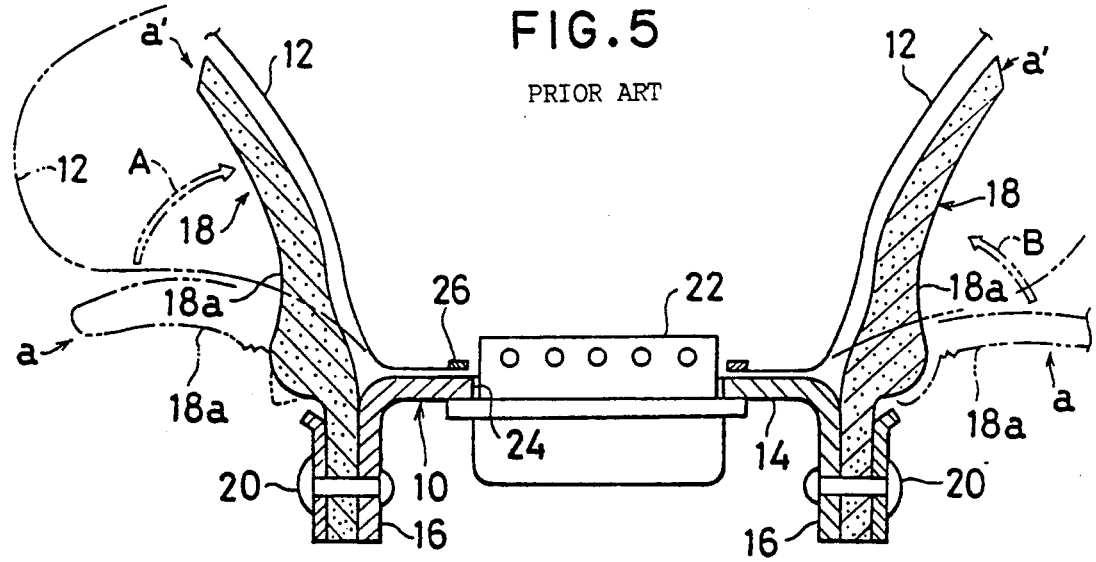
FIG. 5 is an illustration for explaining operation of the conventional air bag system.

FIG. 1 is a sectional view of the air bag system using the cover of one embodiment of the present invention. FIG. 2 is a perspective view for showing the arrangement of the reinforcement of the cover. FIG. 3 is a sectional view for showing a deformation when the cover opens.

A cover 18 of the air bag system is the cover which is attached to a steering wheel. The cover 18 has a box shape having a side wall 18A and canopy 18B and is essentially composed of a synthetic resin, and a network member 30 for reinforcing is the cover is buried in the side wall 18A and canopy 18B. The network member 30 is divided into four pieces and is arranged so that a gap between each network member corresponds to a tear line 28.

The other marks of FIG. 1 indicate the same member in the conventional example, respectively.

In the cover for air the bag system or the air bag system providing the cover as mentioned above, if the inflator 22 actuates to open the air bag 12, the cover 18 cleaves along the tear line 28, thereby opening the air bag 12 within the car. At this time, since the cleavage piece 18a of the cover holds deformed posture by a plastic deformation member 32, the air bag 12 can open immediately and widely.

As the above plastic deformation member, a metal material having a high plastic deformability is suitable for the use.

In the above mentioned embodiment, the inflator is directly attached to the retainer. However, it is possible to apply the present invention to the cover for the air bag system in which the inflator is attached to the retainer through an appropriate member. Further, the present invention can be used for the cover for the air bag system other than the type which is attached to the steering wheel, for example, for an assistant driver's seat.

In the present invention, the network member 30 is preferable to be composed of a synthetic fiber, a metal fiber, or other fibers similar to these two. In stead of the network member 30, it is clear that a material having capable of reinforcing the cover such like a thin metal plate and synthetic resin plate can be used.

What is claimed is:

1. A cover for covering a folded air bag for an air bag system, comprising:
    a side wall adapted to be connected to a retainer of said air bag system;
    a canopy attached to the side wall for facing an occupant of the air bag system, said side wall extending from the canopy in a direction away from the occupant; and
    a plurality of plastic deformation members disposed only in the side wall without extending to the canopy, said canopy, when the air bag opens, cleaving and opening outwardly without being affected by the plastic deformation members until the side wall starts to deform, and then said plastic deformation members deforming together with the side wall outwardly to a maximum position by the air bag, said plastic deformation member holding the deformation state of the side wall to prevent the side wall from returning inwardly after opening to thereby keep the air bag in a fully opened condition.

2. The cover of claim 1, wherein said plastic deformation member is a metal material having a high plastic deformability.

3. The cover of claim 1, wherein said cover is essentially composed of a synthetic resin, and the plastic deformation member is buried within a innerside of said cover.

4. The cover of claim 1, wherein said cover is essentially composed of a synthetic resin, and a reinforcement is buried in said synthetic resin.

5. The cover of claim 1, wherein a tear line for starting a cleavage is contained and said reinforcement is arranged in the portion other than the tear line.

6. An air bag system, comprising;
    a retainer for holding the air bag;
    a folded air bag attached to said retainer; and
    a cover of claim 1 for covering said air bag and attached to said retainer.

7. The cover of claim 1, wherein said plastic deformation members are partly situated inside the side wall so that the side wall can sufficiently deform outwardly when the air bag opens.

* * * * *